United States Patent
Osborne (10) Patent No.: US 6,843,506 B2
(45) Date of Patent: Jan. 18, 2005

(54) SAFETY DEVICE (76) Inventor: Graham William Osborne, Neaches Farm, Felmingham, North Walsham, Norfolk (GB), NR28 OJX (*) Notice: Subject to any disclaimer, the term of this patent is extended or adjusted under 35 U.S.C. 154(b) by 0 days.

(21) Appl. No.: 10/344,740
(22) PCT Filed: Aug. 15, 2001
(86) PCT No.: PCT/GB01/03660
§ 371 (c)(1), (2), (4) Date: Feb. 14, 2003
(87) PCT Pub. No.: WO02/16816
PCT Pub. Date: Feb. 28, 2002

(65) Prior Publication Data
US 2003/0178841 A1 Sep. 25, 2003

(51) Int. Cl.⁷ .................... F16L 35/00; F16L 37/28
(52) U.S. Cl. ................ 285/1; 285/2; 285/114; 285/117; 137/797
(58) Field of Search ............... 137/797, 614.04; 285/1, 2, 114, 117; 182/371, 3

(56) References Cited

U.S. PATENT DOCUMENTS

| 2,048,388 A | * | 7/1936 | Johnsen ............... 137/68.12 |
| 2,291,802 A | * | 8/1942 | Goodall ............... 285/117 |
| 3,197,240 A | * | 7/1965 | Lindberg .............. 285/114 |
| 3,813,733 A | * | 6/1974 | Flohr ................. 285/117 |
| 3,859,692 A | * | 1/1975 | Waterman et al. ....... 24/300 |
| 4,098,438 A | * | 7/1978 | Taylor ................ 222/529 |
| 4,549,332 A | * | 10/1985 | Pouliot ............... 24/335 |
| 4,865,077 A | * | 9/1989 | Batchen et al. ........ 137/614.04 |
| 4,872,471 A | * | 10/1989 | Schneider ............. 137/68.14 |
| 5,417,304 A | * | 5/1995 | Kurtgis ............... 182/150 |
| 5,873,608 A | * | 2/1999 | Tharp et al. .......... 285/114 |
| 6,164,048 A | * | 12/2000 | Rhodes ................ 54/1 |
| 6,546,947 B2 | * | 4/2003 | Abrams ................ 137/68.14 |
| 6,698,544 B2 | * | 3/2004 | Kurtgis ............... 182/3 |

FOREIGN PATENT DOCUMENTS

DE 20006386 * 9/2000

* cited by examiner

Primary Examiner—Eric K. Nicholson
(74) Attorney, Agent, or Firm—Andrus, Sceales, Starke & Sawall, LLP (57) ABSTRACT A safety device (23) for a fluid hose (14) having at one end one part (19) of a separable connector (18) by means of which the hose (14) may be connected to another pipe (21) carrying the other part (20) of the connector, the connector parts separating when the connector (18) is subjected to a tensile load. The device (23) includes an elongate tether (24) having one end attached to the hose (14) at or adjacent the one connector part (19) and its other end attached to the pipe (21) at or adjacent the other connector part (20). The tether (24) is arranged to break when the connector parts has exceeded a pre-set distance, the breaking strain of the tether (24) being lower than the load required to separate the connector (18).

20 Claims, 7 Drawing Sheets

VEHICLE

FIG. 8

VEHICLE

SAFETY DEVICE

CROSS-REFERENCE TO RELATED APPLICATIONS

This application is the U.S. national stage application of International Application PCT/GB01/03660, filed Aug. 15, 2001, which international application was published on Feb. 28, 2002 as International Publication WO 02/16816 in the English language. The International Application claims priority of Great Britain Patent Application 00 20271.3, filed Aug. 18, 2000.

BACKGROUND OF THE INVENTION

This invention relates to a safety device for a fluid hose having at one end a separable connector.

The safety device of the present invention is particularly applicable to liquid fuel dispensing hoses, as used for example on garage forecourt fuel pumps. However, the invention may be used in other areas of industry where a flexible hose is used to dispense a liquid or gas to a movable item, such as a vehicle, a container, or the like. Thus, though in the following the invention will primarily be described with reference to its use for forecourt fuel pumps, nevertheless it is to be understood that the invention is not limited to that use.

A recognised problem with a garage forecourt fuel pump having a flexible hose fitted at its free end with a dispensing nozzle incorporating a control valve is that the hose can become damaged, so leading to a loss of fuel which is both a fire risk and an environmental hazard. One fairly common source of such hose damage is when a motorist, on completing the filling of his vehicle's fuel tank, then drives off leaving the dispensing nozzle still in the filler pipe of the vehicle. A similar problem can arise with L.P.G. where the nozzle is physically connected to a vehicle's filler pipe.

In an attempt to minimise the damage to both the hose and the pump, and also to minimise the loss of fuel, it is known to fit a forecourt fuel pump hose with a two-part connector which automatically separates when the hose is subjected to a tensile load above some pre-determined level. The two parts of the connector both include spring-loaded non-return valves which automatically close on the connector separating under an applied tensile load, so as to prevent any loss of fuel from the fuel pump side, bearing in mind that the pump might still be running, as well as from the part of the hose downstream of the connector. Such connectors may be provided between a rigid pipe associated with the fuel pump and the flexible hose, partway along the length of the hose, or at the dispensing nozzle, to connect the hose to the nozzle.

Though a two-part connector of the kind described above can significantly reduce the fire risk and pollution risk caused by a motorist driving away whilst the dispensing nozzle is still located in the fuel filler pipe of his vehicle, it is found that if the connector is to stay connected for all normal usage of the fuel pump, the tensile load required to separate the connector under emergency conditions must be set relatively high. In that case, considerable energy will be stored in the flexible hose by the tensile load applied to that hose at the point at which the connector parts separate. This stored energy, on being released on separation of the connector parts, can do considerable damage to the fuel pump or the vehicle, depending upon the location of the connector. For example, if the connector is at the upstream end of the flexible hose, to connect that hose to a rigid pipe of the fuel pump, then the upstream end of the hose together with its connector part can snake back to the vehicle, and cause significant damage to the vehicle. Conversely, if the connector is at the dispensing nozzle end, the free end of the hose can spring back towards the pump and cause damage there. Further, in either case, persons standing nearby can be hit by the hose, moments after the connector separates.

SUMMARY OF THE INVENTION

The present invention aims to reduce the likelihood of damage to equipment in the vicinity of a flexible hose used to dispense liquids or gases, or injury to persons in the vicinity, in the event that the hose is subjected to a sufficient tensile load to cause a connector provided in that hose to separate under the load.

According to one aspect of the present invention, there is provided a safety device for a fluid hose having at one end one part of a separable connector by means of which the hose may be freed from another pipe carrying the other part of the connector when the connector is subjected to a tensile loads, which device comprises an elongate tether having one end attached to the hose at or adjacent said one part of the connector and its other end attached to the pipe at or adjacent the other part of the connector, the tether being arranged to part when the connector parts have separated under an applied load only once the separation of the connector parts exceeds a pre-set distance.

With the safety device of this invention, it will be appreciated that the likelihood of damage is reduced in the case of a hose having a two-part connector separable by means of an applied tensile load, in view of the relatively low strength of the tether as compared to the tensile load required to separate the connector pads. The tether may serve to absorb much of the energy stored in the hose at the point of separation, before the tether itself separates consequent upon the absorption of that load or on being subjected to a continuing load. Then, the end of the hose having said one part of the connector may simply fall to the ground, minimising the probability of any damage or injury occurring.

It is highly preferred that the length of the tether is greater than the distance between the attachment points thereof, respectively to the hose and the pipe. In this case, the excess length of the tether may be contained in packaging disposed alongside the connector. For example, the packaging may comprise a rigid tube, the two end portions of the tether leaving the tube respectively through the two ends of the tube. To resist movement of the tether out of the tube, each end of the tube may be provided with friction means engaging with the tether. In one embodiment, such friction means comprises a resilient gland through which the tether passes.

An alternative to having a tether of a greater length than the distance between the attachment points thereof, the tether may comprise a strop of a synthetic polymer of a known kind, which undergoes significant extension under a substantially constant tensile load until the strop has stretched to such a length that it has reached its breaking point. Such polymers are well known and include certain classes of polyethylene.

One end portion of the tether may be secured to the hose by means of a loop formed from the tether to pass around the hose, which loop is secured to the hose by means of a ferrule crimped around the bight of the tether and the free end thereof. Of course, the other end of the tether may equally be secured to the pipe to which the hose is connected in much the same way. In a case where the excess length of the tether is contained in a tube, that tube may be secured to the connector, for example by means of conventional plastic cable ties. As an alternative, the tether may be secured to the two parts of the coupling so as to be indirectly connected to the hose and pipe. In this case, each coupling part may be provided with a lug to which the respective end portion of the tether is secured. A further possibility is to secure the tether to the hose and pipe with plastic cable-ties which are easy to fit but can be removed only by destroying the tie.

Yet another possibility is for the tether to be arranged to extend internally of the coupling itself, so as not to be visible or accessible from the outside. Such a tether may operate in much the same manner as has been described above. This arrangement would be particularly suitable to a tether in the form of a strop which undergoes significant elongation under a substantially constant tensile load, until breaking at some pre-defined extension.

It will be appreciated that the pipe carrying the other part of the connector could be a rigid pipe in the case of a forecourt fuel pump, with the connector mounted at the upstream end of the hose. In the alternative, the pipe could be the inlet duct of a dispensing nozzle, when the connector is mounted at the downstream end of the hose. For a hose having the connector provided partway between the ends, said pipe will be the other part of the flexible hose.

This invention relates to a liquid fuel pump having a flexible fuel delivery hose connected to a fuel delivery pipe by means of a two-part connector arranged to separate when the tensile load applied to the hose exceeds a pre-determined value, whenever the connector is fitted with a safety device of this invention as described above. Said pipe may comprise a further length of flexible hose, or a rigid pipe. In the alternative, the invention extends to a liquid fuel pump having a flexible fuel delivery hose connected to a dispensing nozzle by means of a two-part connector arranged to separate when the tensile load applied to the hose exceeds a pre-determined value, whenever the connector is fitted with a safety device of this invention as described above.

BRIEF DESCRIPTION OF THE DRAWINGS

By way of example only, one specific embodiment of this invention will now be described in detail, reference being made to the accompanying drawings, in which:-

DETAILED DESCRIPTION OF THE INVENTION

Figure 1:
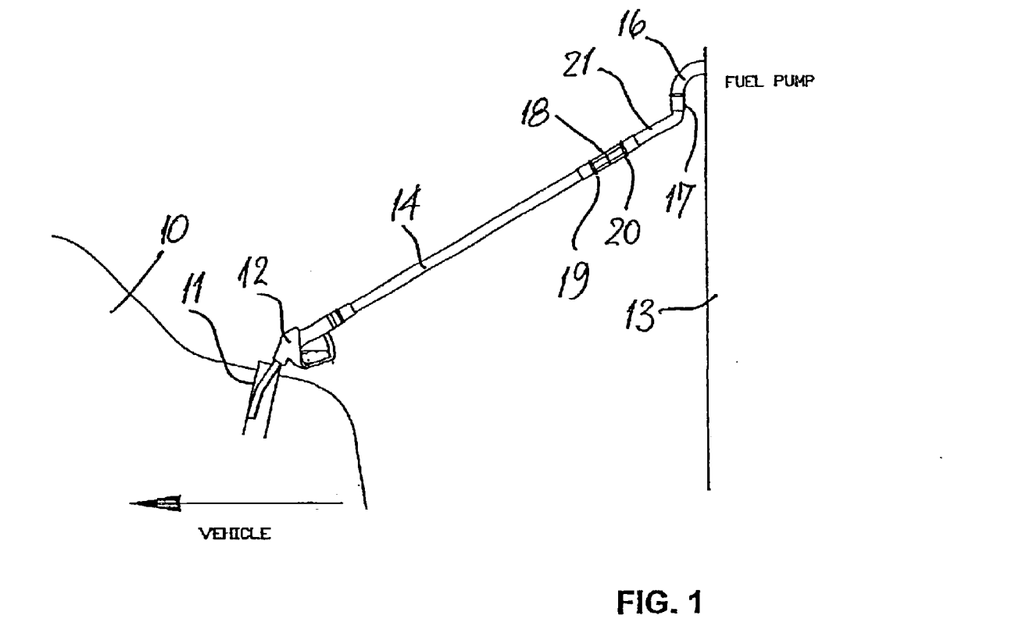
FIGS. 1 and 2 diagrammatically illustrate the problem associated with a conventional forecourt fuel delivery flexible hose.
Figure 2:
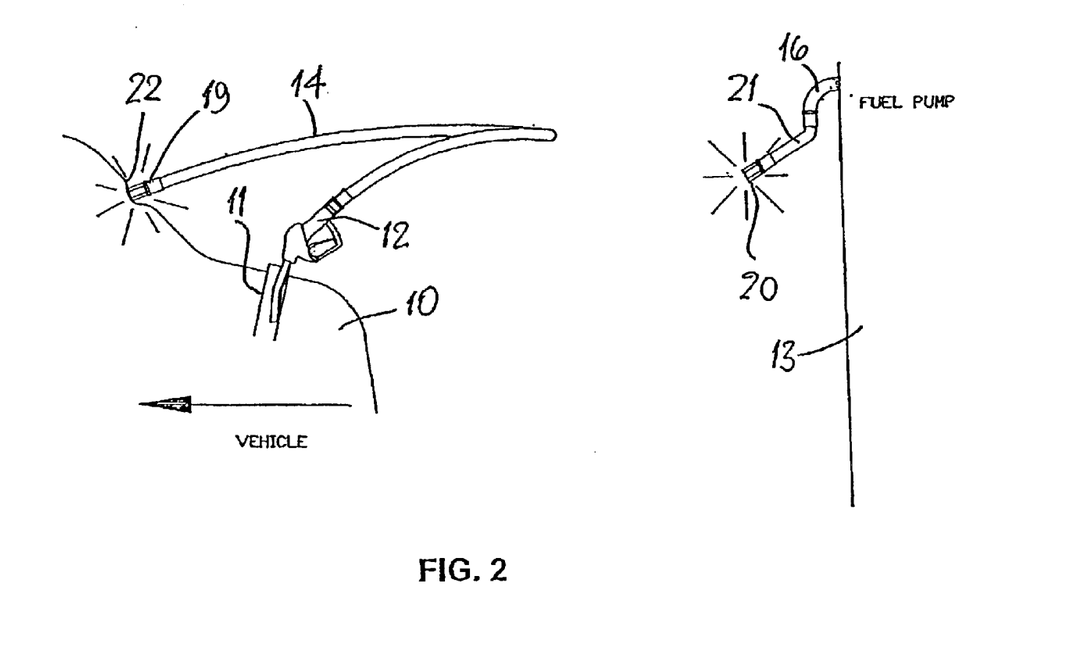

Referring initially to FIGS. 1 and 2, there is shown diagrammatically a vehicle 10 having a fuel filler pipe 11, in which has been inserted the dispensing nozzle 12 of a conventional garage forecourt fuel pump 13. The nozzle 12 is connected to the fuel pump by means of a flexible hose 14 of a reinforced fuel-proof elastomeric material. The hose is secured to pump output rigid pipe 16 by means of a screw-threaded connector 17 and has, near the rigid pipe 16, an in-line separable connector 18 having a first part 19 connected to the main length of the hose 14 and a second part 20 connected to a short length 21 of the hose, between the connector 18 and the rigid pipe 16. The connector 18 is of a known design and is arranged to have its two parts 19,20 separate automatically when the hose 14 is subjected to a tensile load exceeding some pre-determined value. The two connector parts 19,20 are each provided with a respective automatically operating shut-off valve, such that in the event the parts of the connector 18 separate, the valves close and the loss of fuel is minimised.

As shown in FIG. 2, the problem associated with the known arrangement of FIG. 1 is that when the connector 18 separates on account of the applied tensile load exceeding the predetermined value, for example should the vehicle move off while the nozzle 12 is still located in the filler pipe 11, very considerable energy is stored in the stretched hose 14. On the parts of the connector 18 separating, the end of the hose 14 carrying the connector first part 19 springs back to the vehicle 10 and can cause significant damage, as shown diagrammatically at 22. In the alternative, or possibly in addition, the hose 14 on snaking back towards the vehicle may cause injury to persons standing in the vicinity of the pump 13.

Figure 3:
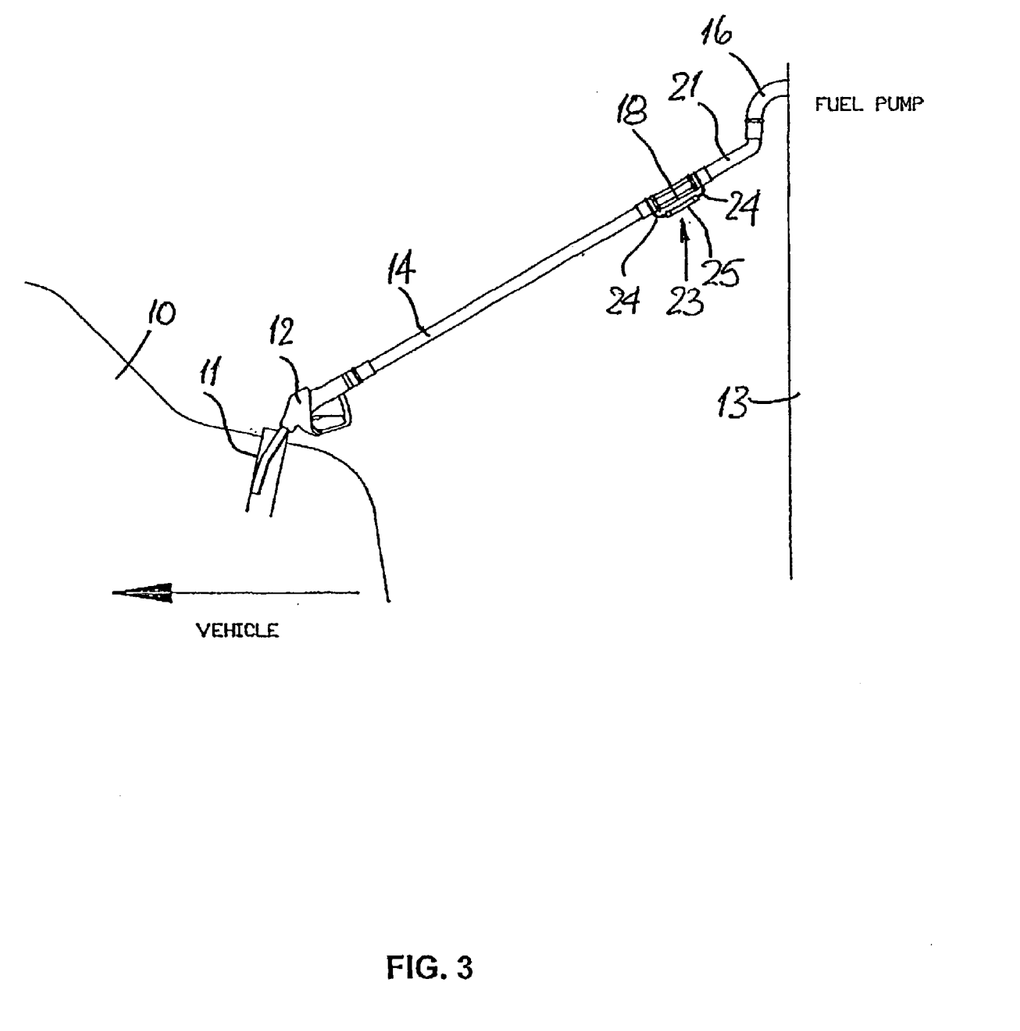
FIGS. 3, 4 and 5 illustrate the embodiment of a safety device as applied to the system of FIGS. 1 and 2.
Figure 4:
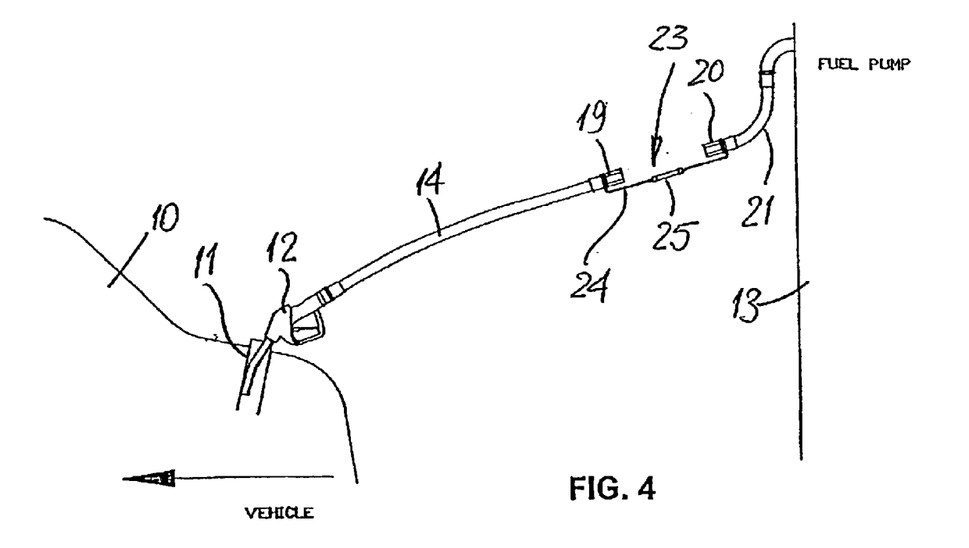
Figure 5:
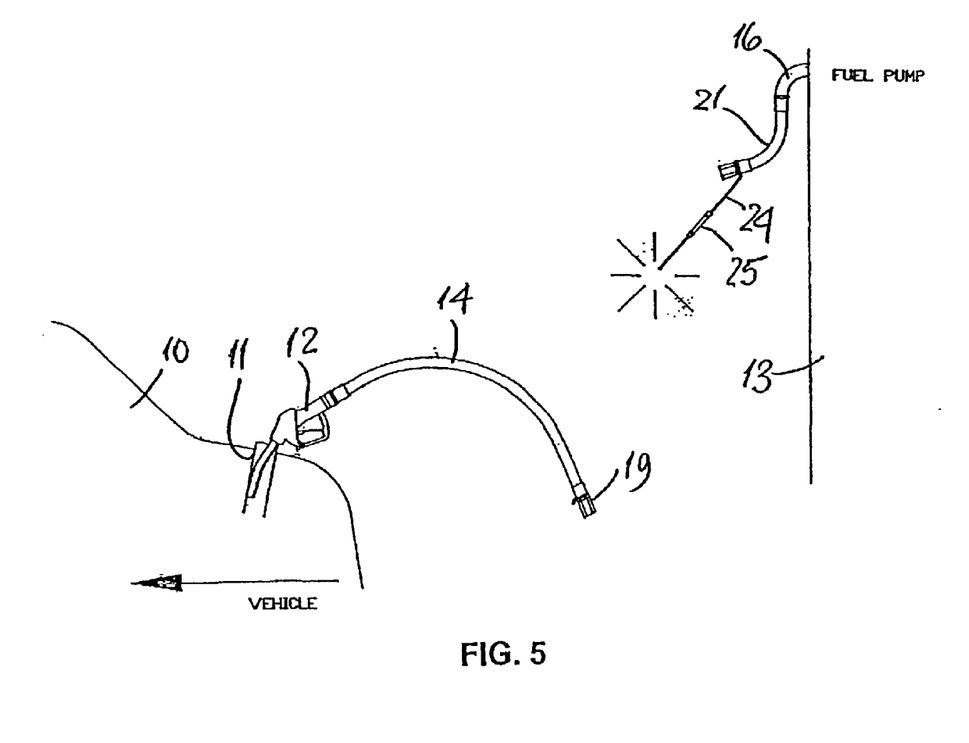

FIGS. 3 to 5 show the arrangement of FIG. 1, but with a safety device of this invention associated with the connector 18. This safety device 23 includes a tether 24 having one end secured to hose 14 immediately adjacent the first part 19 of connector 18, and the other end of the tether secured to the short length of hose 21 connected to the rigid pipe 16, again immediately adjacent the second part 20 of connector 18. The tether 24 has a greater length than the distance between its connection points and the excess length is hanked inside a tube 25, as will be described in greater detail below.

On the vehicle 10 driving away and so imparting a sufficient tensile load to hose 14 to cause connector 18 to separate, the tether will pull out of the tube 25 and then absorb much of the energy of the hose 14, as shown in FIG. 4. If the vehicle immediately stops, on hearing the connector 18 separate, it is possible that the tether 24 will be able to absorb all of the energy and so still keep the connector parts linked together. On the other hand, if the vehicle continues to move away, the tether itself will part, but since the tensile load required to achieve this is very much less than that required to separate the connector 18, little energy will be stored in the hose. Thus, the end of the hose 14 carrying first connector part 19 will fall harmlessly to the ground, as shown in FIG. 5.

Figure 6:
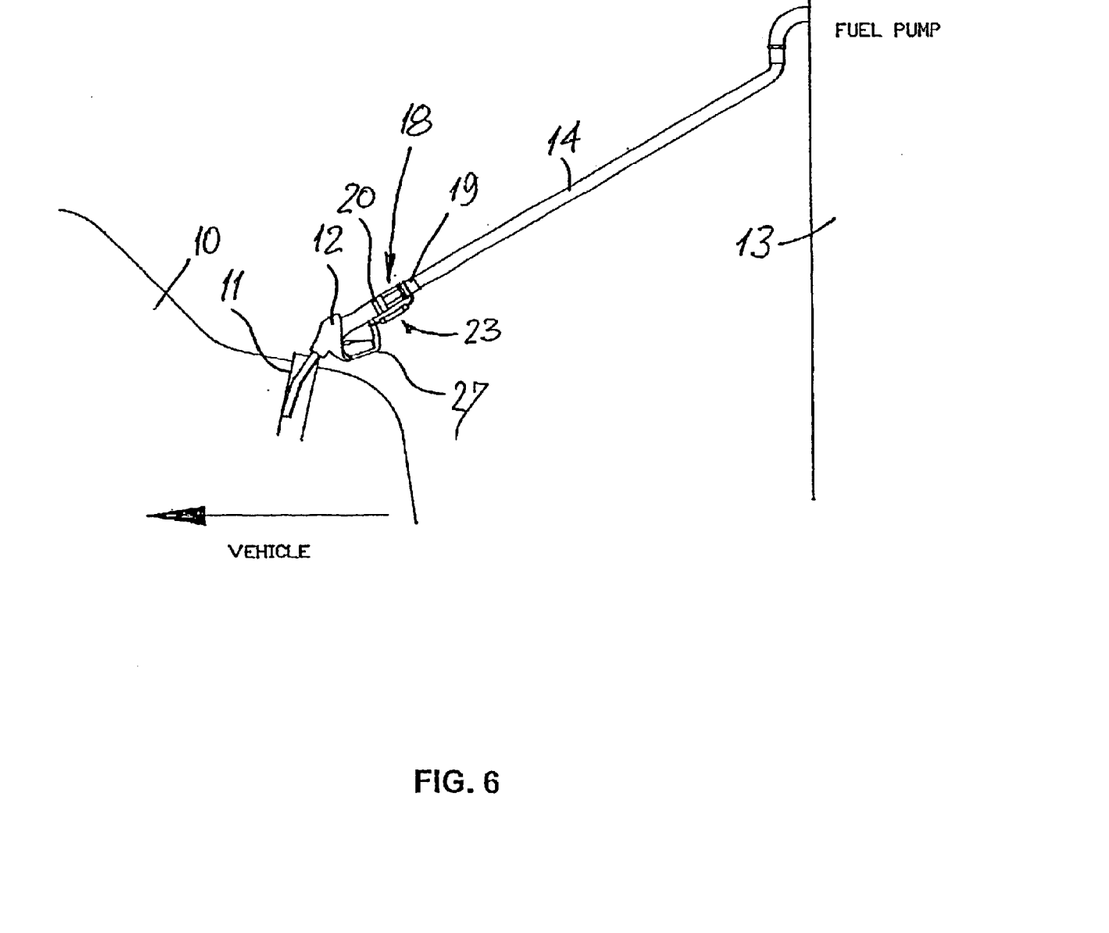
FIGS. 6, 7 and 8 illustrate an alternative arrangement using the embodiment of safety device, with a connector arranged adjacent the delivery nozzle of a fuel pump.
Figure 7:
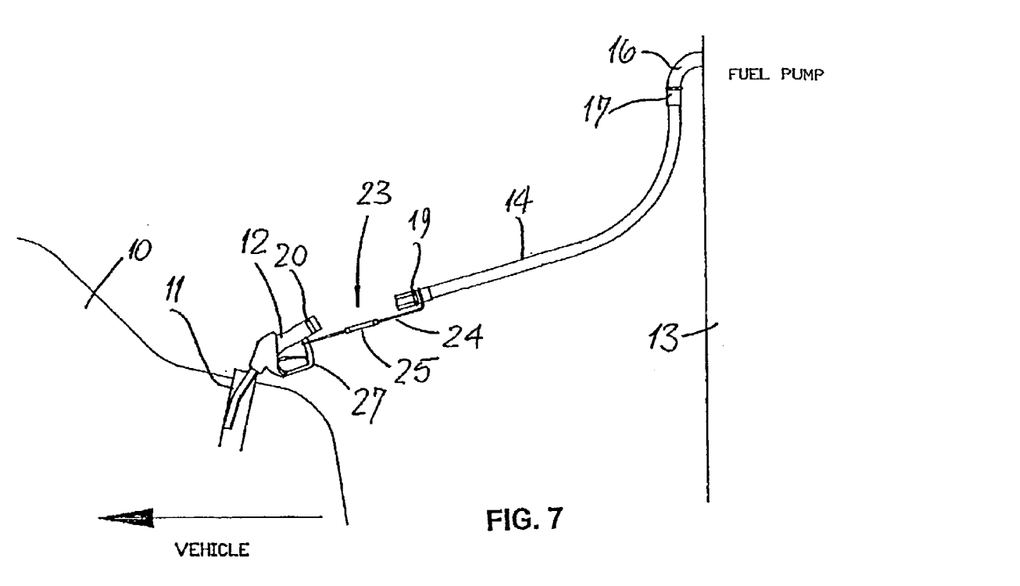
Figure 8:
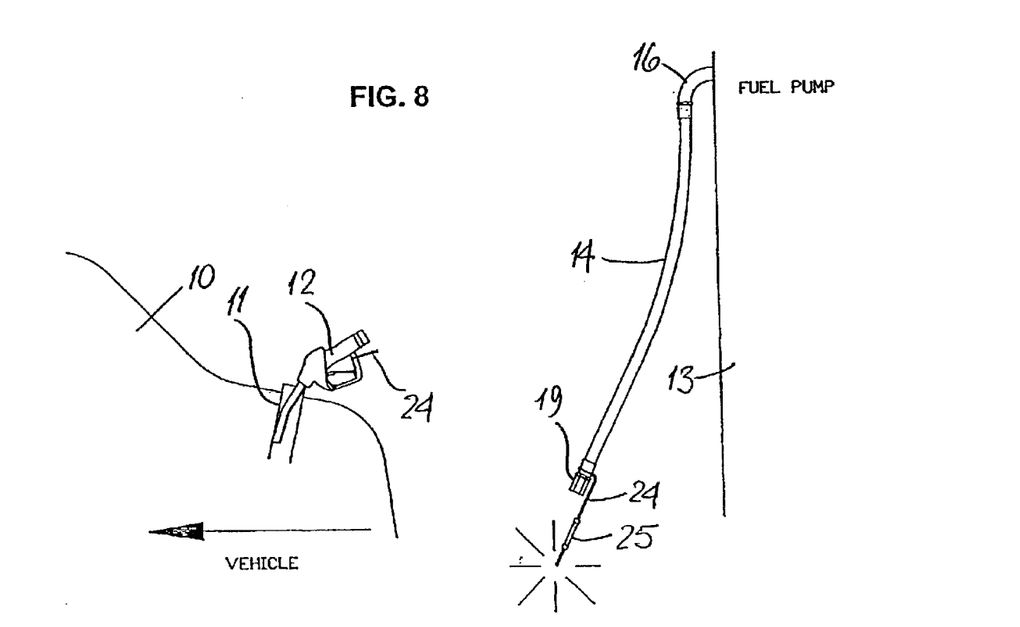

FIGS. 6, 7 and 8 show an arrangement broadly similar to that of FIGS. 3, 4 and 5 respectively, but here the connector 18 is provided between the downstream end of hose 14 and the dispensing nozzle 12. In this case, the safety device 23 is connected between the hose 14 and the trigger guard 27 of the nozzle 12, with the tube 25 again lying alongside the connector 18. In the event that the vehicle moves away with the nozzle 12 still in the filler pipe 11, the connector will separate but the tether 24 will absorb much of the energy stored in hose 14 (FIG. 7), before the tether separates as shown in FIG. 8 if the vehicle has not, by then, stopped. Again, the free end of the hose 14 will fall harmlessly to the ground.

Figure 9A:
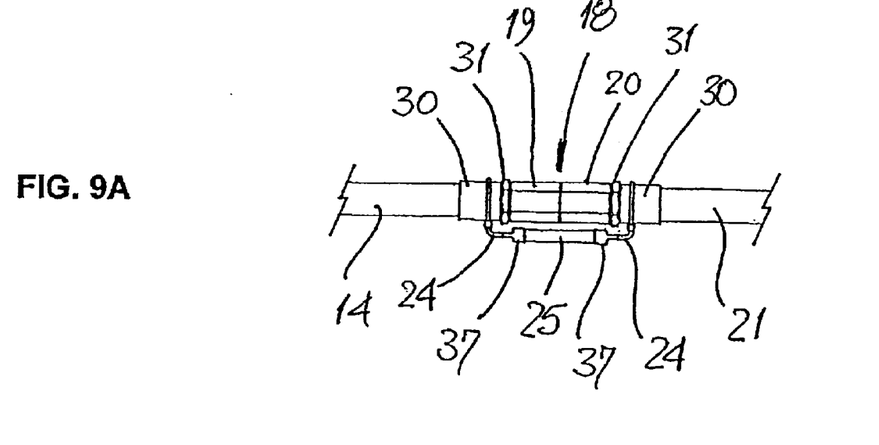
FIGS. 9A, 9B and 9C illustrate the embodiment of safety device of this invention in greater detail.
Figure 9B:
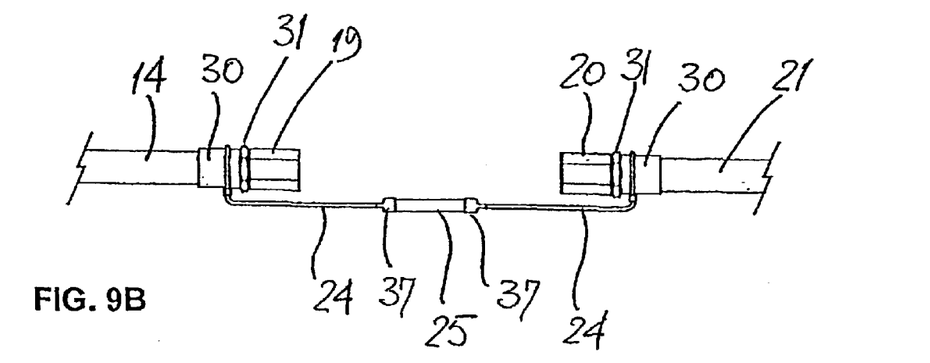
Figure 9C:
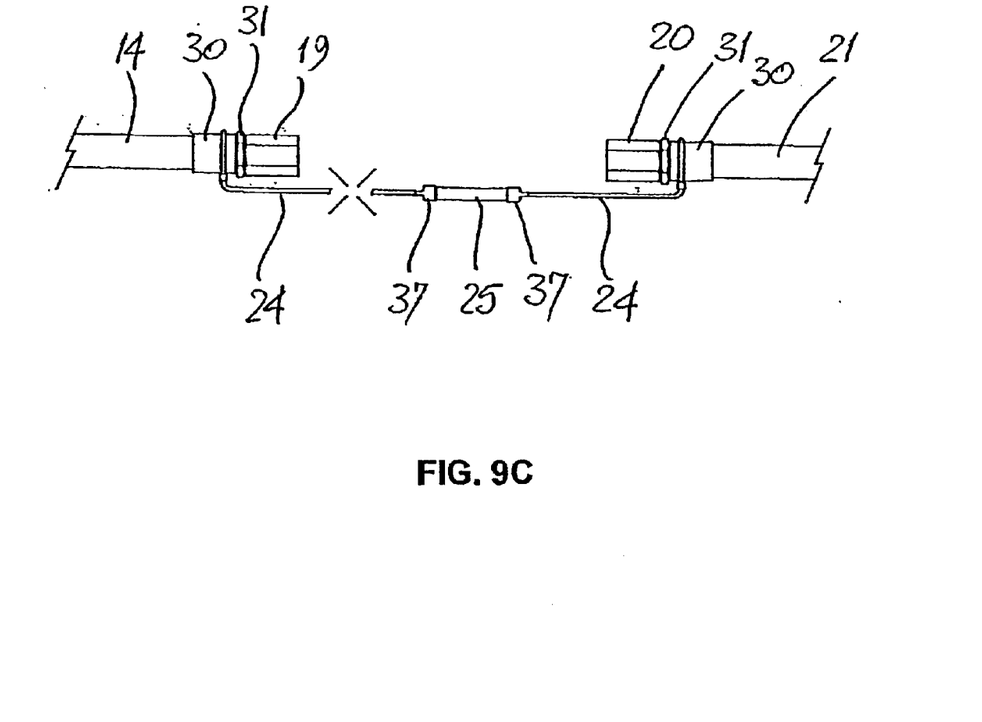

FIGS. 9A, 9B and 9C show in more detail the connector arrangement, as shown in FIG. 3. Hose 14 is provided with a crimped-on end fitting having a tube (not shown) extending within the end portion of hose 14, and a sleeve 30 crimped externally on to the hose. The tube has a projecting external screw-thread; the first part 19 of the connector is threaded thereon and is secured by lock nut 31. The arrangement of the second part 21 of connector 18 is essentially the same. The safety device 23 has the two ends of the tether 24 secured around the crimped sleeves 30, such that the tube 25 of the safety device lies closely alongside the two connector parts 19,20. If required, the tube may be held in place by means of plastic cable ties.

On the connector 18 separating following an applied tensile load to hose 14, the tether pays out of the tube 25 as shown in FIG. 9B. If the tensile load continues, then the tether itself will separate, as shown in FIG. 9C.

Figure 10:
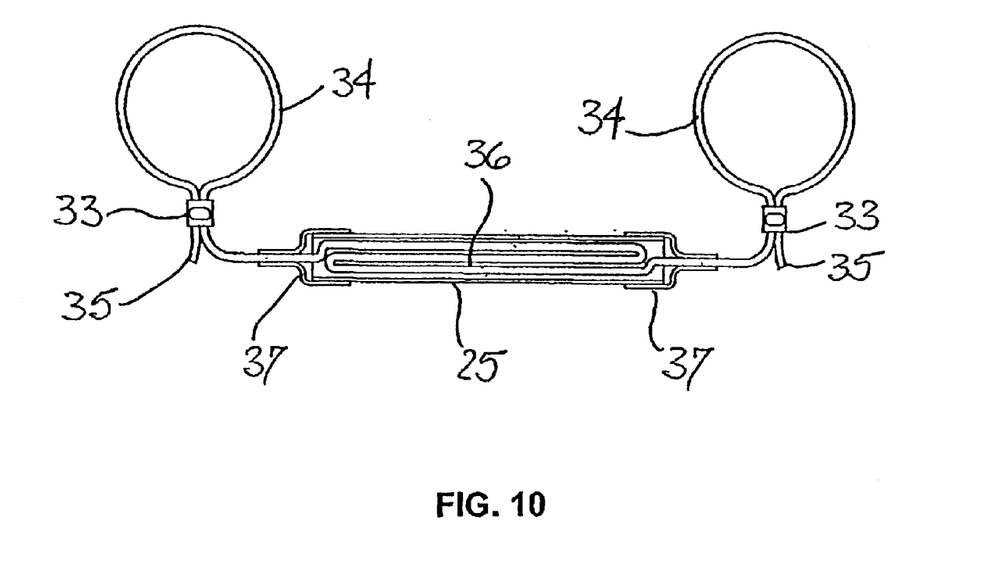
FIG. 10 is a diagrammatic cross-section through the device of FIGS. 9A, 9B and 9C.

FIG. 10 illustrates the arrangement of the tether and tube 25. As shown, a loop is formed in the end portion of the tether by means of a ferrule 33 threaded on to the bight 34 of the tether and receiving also the free end 35 of the tether after that free end has been passed around the sleeve 30. The loop is pulled tight and then the ferrule 33 crimped to secure the end portion in place. The excess length of the tether is hanked inside the tube 25, as shown at 36. Rubber glands 37 are fitted over the ends of the tube 25 with the tether passing out of those glands, the tether being lightly gripped by the glands 37 so as to resist inadvertent withdrawal of the tether, other than when the connector 18 separates.

The strength of the tether as well as the material from which it is made should be selected having regard to the load required to separate the connector 18, at well as the energy stored in the hose 14 at the point of separation. However, to ensure the tether will separate before further energy builds up in the hose 14, the breaking load of the tether should be very much less than the separation load of the connector 18, which could be as much as 250 lbf.

What is claimed is:

1. A safety device for a fluid hose connected to a pipe by a two-part separable connector, one part of the connector being provided on one end of the hose and the other part of the connector being provided on the pipe whereby the hose may be freed from the pipe when the connector is subjected to a tensile load, said safety device comprising an elongate flexible tether disposed externally of the hose, pipe and connector, said tether having one end attached to the hose at or adjacent said one part of the connector and said tether having its other end attached to the pipe at or adjacent the other part of the connector, the tether being arranged to hold the one end of the hose to the pipe when the connector parts have separated under an applied load until the separation of the connector parts reaches a pre-set distance whereafter the tether breaks when the separation of the parts exceeds said pre-set distance.

2. A safety device as claimed in claim 1, wherein the breaking strain of the tether is lower than said load required to separate the connector.

3. A safety device as claimed in claim 1, wherein the length of the tether is greater than the distance between the attachment points thereof respectively to the hose and pipe, the excess length of the tether being contained in packaging disposed alongside the connector.

4. A safety device as claimed in claim 3, wherein the packaging comprises a rigid tube, the two end portions of the tether leaving the tube respectively through the two ends of the tube.

5. A safety device as claimed in claim 4, wherein each end of the tube is provided with friction means to resist the movement of the tether out of the tube.

6. A safety device as claimed in claim 5, wherein the friction means comprises a resilient gland through which the tether passes.

7. A safety device as claimed in claim 1, wherein the tether comprises a synthetic material cord or strap.

8. A safety device as claimed in claim 1, wherein the tether comprises a strop of a synthetic polymer which undergoes significant extension under a substantially constant tensile load until the strop reaches its breaking point.

9. A safety device as claimed in claim 1, wherein one end portion of the tether is secured to the hose by means of a loop passing around the hose which loop is formed by the free end of the tether being secured to the bight by means of a crimped ferrule.

10. A safety device as claimed in claim 1, wherein the tether is secured to the two parts of the coupling so as to be indirectly connected to the hose and pipe.

11. A safety device as claimed in claim 10, wherein a component of each coupling part is provided with a lug to which the end portion of the tether is secured.

12. A liquid-fuel pump having a flexible fuel delivery hose connected to one of a fuel delivery pipe and a dispensing nozzle by means of a two part connector arranged to separate when the tensile load applied to the hose through the connector exceeds a pre-determined value, whenever the connector is fitted with a safety device as claimed in claim 1.

13. A safety device for a fluid hose having at one end one part of a separable connector by means of which the hose may be freed from another pipe carrying the other part of the connector when the connector is subjected to a tensile load, said safety device comprising an elongate flexible tether having one end attached to the hose at or adjacent said one part of the connector and its other end attached to the pipe at or adjacent the other part of the connector, the length of the tether being greater than the distance between the attachment points thereof respectively to the hose and pipe whereby there is an excess length of the tether, and the tether is arranged to break when the connector parts have separated under an applied load only once the separation of the connector parts exceeds a pre-set distance.

14. A safety device as claimed in claim 13, wherein the breaking strain of the tether is lower than said load required to separate the connector.

15. A safety device as claimed in claim 13, wherein said excess length of the tether is contained in packaging disposed alongside the connector.

16. A safety device as claimed in claim 15, wherein the packaging comprises a rigid tube, the two end portions of the tether leaving the tube respectively through the two ends of the tube.

17. A safety device as claimed in claim 16, wherein each end of the tube is provided with friction means to resist the movement of the tether out of the tube.

18. A safety device as claimed in claim 17, wherein the friction means comprises a resilient gland through which the tether passes.

19. A safety device as claimed in claim 13, wherein the tether comprises a synthetic material cord or strap.

20. A safety device as claimed in claim 19, wherein the tether comprises a strop of a synthetic polymer which undergoes significant extension under a substantially constant tensile load until the strop reaches its breaking point.

* * * * *